Nov. 19, 1957 R. BINDER 2,813,942
SWITCH FOR ACTUATING AN ELECTRICALLY OPERABLE
CLUTCH OF A VEHICLE OR THE LIKE
Filed Nov. 16, 1955 2 Sheets-Sheet 1

INVENTOR
Richard Binder
by: Michael S. Striker
age

United States Patent Office 2,813,942
Patented Nov. 19, 1957

2,813,942

SWITCH FOR ACTUATING AN ELECTRICALLY OPERABLE CLUTCH OF A VEHICLE OR THE LIKE

Richard Binder, Schweinfurt (Main), Germany, assignor to Firma Fichtel & Sachs A. G., Schweinfurt (Main), Germany Application November 16, 1955, Serial No. 547,249

Claims priority, application Germany November 17, 1954

4 Claims. (Cl. 200—61.54)

The present invention relates to switches and in particular to a switch for use in a vehicle for energizing electrical structure for disengaging the clutch of the vehicle when the gear shift lever of the vehicle is actuated.

With structures of the above type there is a very great difficulty in regulating the angle through which the gear shift lever portion which is actuated by the operator must be turned in order to close a switch for disengaging the clutch, and furthermore there is the problem of maintaining the angular distance through which the manually operable member is moved at the proper adjusted position after the switch parts wear, such wear causing the movable member engaged by the operator to move through a larger distance before closing the switch.

One of the objects of the present invention is to provide a switch which overcomes the above drawbacks by including parts which are subject to very little wear during their operation.

Another object of the present invention is to provide a switch of the above type which cleans itself to some extent whenever the switch is engaged.

A further object of the present invention is to provide a switch of the above type with a means for very easily and accurately adjusting the distance through which the manually engaged bowl part of the switch must be moved in order to close the switch.

An additional object of the present invention is to provide a switch arrangement which will close only when the manually operable part of the switch is moved in a given direction.

With the above objects in view the present invention mainly consists of a switch which includes a first bar having a free end portion and a first switch contact means located at said free end portion of the first bar. An elongated hollow member is fixed to and extends from the free end portion of the first bar and terminates distant from the free end portion of the first bar in an inwardly extending annular flange. A second bar extends through the annular flange of the hollow member into the interior of the latter and is provided within the hollow member with an outwardly extending annular flange which engages the inwardly extending annular flange of the hollow member. This second bar carries within the hollow member a second switch contact means which is spaced slightly from the first switch contact means and which is directed towards the same. A spring means within the hollow member respectively engages the first and second bars for urging the same apart from each other in order to maintain the first and second switch contact means spaced from each other until the second bar is manually tilted against the influence of the spring means to place the first and second switch contact means in engagement with each other for closing the switch.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is an elevational view of a switch of the present invention which is adapted to extend upwardly from the floor in the interior of a vehicle such as an automobile or the like;

Figure 1:
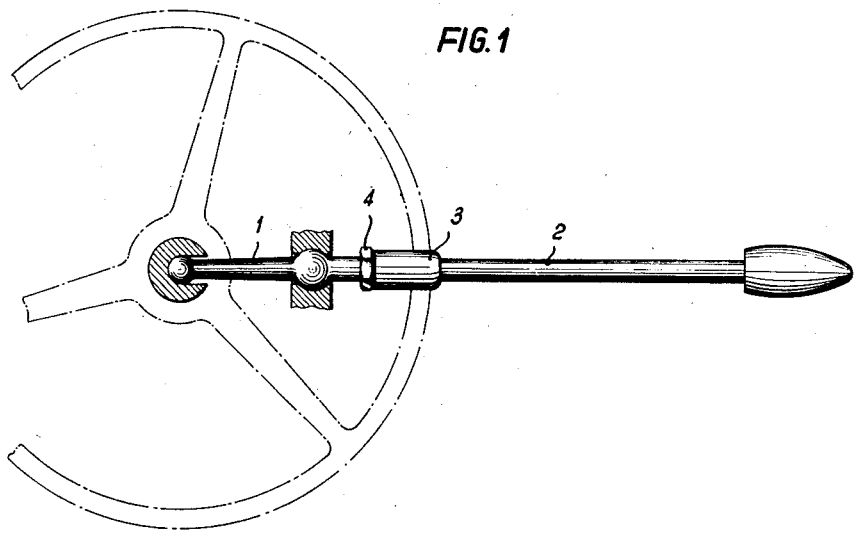
Fig. 1 is a plan view of a switch constructed in accordance with the present invention, the switch of Fig. 1 being shown associated with fragmentarily and sectionally illustrated parts of a vehicle, the steering wheel being shown in dot-dash lines in Fig. 1.
Figure 2:
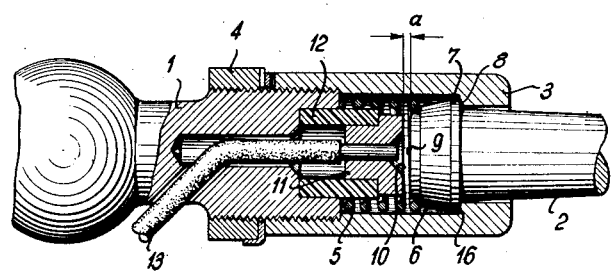
Fig. 2 is a fragmentary partly sectional view on an enlarged scale illustrating the details of the switch of Fig. 1, the section of Fig. 2 being taken in a plane which includes a central axis of the switch structure.
Figure 3:
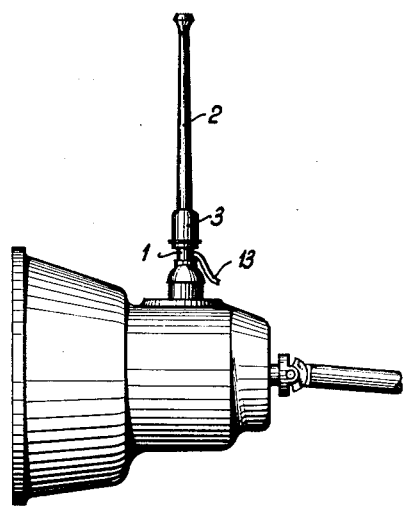

Referring now to the drawings and to Figs. 1 and 2 in particular, it will be seen that the switch of the present invention forms part of the speed change lever of a vehicle such as an automobile. This speed change lever is composed of lever portions 1 and 2, these lever portions 1 and 2 being in the form of bars which have free end portions located adjacent each other and which form extensions of each other. As is evident from Fig. 1, the lever portion 1 is pivotally mounted by a stationary structure intermediate its ends, and the left end of the lever portion 1, as viewed in Fig. 1, is operatively connected to the mechanism which changes the transmission ratio of the drive of the vehicle when the lever portion 1 is turned to a given position about its turning axis. The lever portion 1 is turned by manual actuation of the lever portion 2, but the lever portion 2 first is angularly displaced through a certain distance before it turns the lever portion 1, and during this first angular displacement of the lever portion 2 with respect to the lever portion 1 the switch of the present invention is closed in order to automatically energize a known electrical structure which disengages the clutch. Thus, the switch structure of the present invention is associated with a gear shift lever which is adapted to automatically disengage the clutch whenever the gear shift lever is actuated for changing the speed position of the transmission of the vehicle.

Referring to Fig. 2, it will be seen that the free end portion of the bar 1 is threaded and has an elongated hollow member threadedly connected to itself and extending from its free end portion, this hollow member being coaxial with the bar 1 and terminating distant from the free end portion of the bar 1 in an inwardly extending annular flange 3. A lock nut 4 associated with a suitable lock washer also threadedly engages the free end portion of the bar 1 to maintain the hollow member in a fixed position with respect to the bar 1. The lever portion 2 also is in the form of a bar which extends freely through the inwardly extending annular flange 3, and within the hollow member the bar 2 is provided with an outwardly extending annular flange 7. As is evident from Fig. 2 the outwardly extending annular flange 7 engages the inwardly extending annular flange 3.

The bars 1 and 2 are provided within the interior of the elongated hollow member which terminates in the flange 3 with a pair of switch contact means, respectively, which are adapted to engage each other for closing the switch whenever the bar 2 is tilted. Thus, it will be seen that the switch contact means connected to the bar 1 includes a tubular insulating member 12 fixed to and extending beyond the free end portion of the bar 1, this insulating member 12 carrying a switch contact member 11 which extends into the interior of the insulating member 12. The contact member 11 of this switch contact means terminates in a circular switch contact surface 10 shown in Fig. 2. An electrical lead 13 which is insulated from the bar 1 extends through suitable bores of the latter into electrical engagement with the contact member 11, as is evident from Fig. 2. The other switch contact means is formed by the end face 9 of the electrically conductive bar 2 which is grounded. The end face 9 which forms the other switch contact means is also circular and is directed toward the contact surface 10 and spaced from the latter by the distance a, as shown in Fig. 2.

A coil spring 5 is located within the hollow member and respectively engages the bars 1 and 2 for urging the same apart from each other in order to maintain the contact surfaces 9 and 10 spaced from each other in the rest position of the part shown in Fig. 2.

It is believed to be apparent that when the bar 2 is manually tilted by the operator, this bar 2 will tilt for example about the point 8 or about the point 16 at the engaging surfaces of the flanges 3 and 7 in order to cause the contact surfaces 9 and 10 to engage each other in order to close the switch. Of course the bar 2 will be tilted in a direction which will cause the transmission of the vehicle to be changed to a desired speed, and with the arrangement of Figs. 1 and 2 because the contact surfaces 9 and 10 are circular the switch will be closed irrespective of the direction in which the bar 2 is manually tilted. It will be noted that the bar 2 is tapered with respect to the inner face of the inwardly extending annular flange 3, so that there is sufficient freedom for the bar 2 to tilt to the desired extent.

The extent to which the bar 2 is tilted in order to bring about closing of the switch by engagement of the contact surfaces 9 and 10 depends upon the size of the distance a between the surfaces 9 and 10. In accordance with the present invention it is possible to easily adjust the distance a simply by turning the hollow member which houses the switch structure with respect to the bar 1. It is not desirable to provide a very large distance a because this will result in undesirable wearing of the contact surfaces, inasmuch as there will be more friction the greater the distance a is adjusted to. However, even when the distance a is maintained fairly small, there will nevertheless be a slight rubbing of the contact surfaces, and this slight rubbing will produce a very desirable cleaning action.

Figure 4:
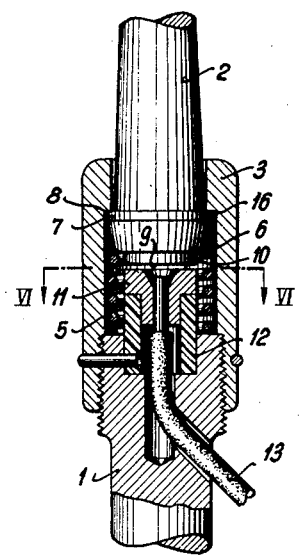
Fig. 4 is a partly sectional view on an enlarged scale illustrating the details of the switch of Fig. 3.
Figure 5:
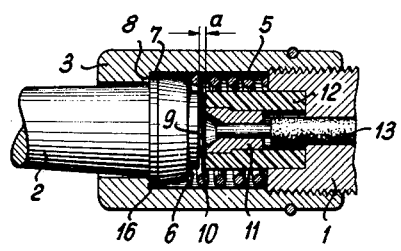
Fig. 5 is a fragmentary sectional view taken along line V—V of Fig. 6 in the direction of the arrows.

In certain cases it is not desirable to be able to close the switch by movement of the manually operable member in all directions. Thus, where the gear shift lever is the type which extends upwardly from the floor of the vehicle and is located beside a leg of the operator, between the operator and a passenger located beside the operator, for example, it could easily happen that the clothing of the occupants of the vehicle or careless movement of the occupants of the vehicle moves the gear shift lever and thus would cause the clutch to become automatically disengaged at an undesired time. The embodiment of Figs. 3–6 prevents such an undesirable result. Referring now to Figs. 3–6, it will be seen that most of the switch structure is identical with that of Figs. 1 and 2, one of the differences of the structure of Figs. 3–6 being that the switch structure forms part of a gear shift lever which extends upwardly from the floor of the vehicle and is connected to the transmission thereof in the manner shown in Fig. 3. Furthermore the lock nut 4 is omitted and instead a wire as shown in Figs. 4 and 5 extends along an annular groove in the outer surface of the hollow member extending from the free end portion of the bar 1, this wire extending into aligned bores of the hollow member and the bar 1 as well as the insulating member 12, as indicated in Fig. 4, in order to fix these parts to each other. Whenever it is desired to adjust the distance a indicated in Fig. 5, this wire is removed and the parts are turned with respect to each other so as to produce an axial movement of the bar 1 with respect to the hollow member extending from the free end portion thereof, and then the wire is inserted into another set of aligned holes drilled for this purpose.

Figure 6:
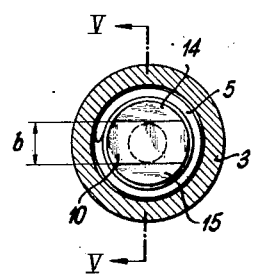
Fig. 6 is a sectional plan view taken along line VI—VI of Fig. 4 in the direction of the arrows.

The main difference between the embodiment of Figs. 3–6 and that of Figs. 1 and 2 is that with the embodiment of Figs. 3–6 both of the contact surfaces 9 and 10 are not circular. While the contact surface 9 is still circular the contact surface 10 is now elongated and has a width b as shown in Fig. 6. Thus, with the embodiment of Figs. 4–6 the contact member 11 instead of extending beyond the insulating member 12 has an end contacting face 19 which is flush with the end face of the insulating member 12 which is distant from the free end portion of the bar 1, as is clearly evident from Fig. 5. Thus, the contact face 10 of this embodiment which would otherwise be circular is instead elongated, as indicated in Fig. 6, and is bounded at its opposite sides by the end face portions 14 and 15 of the insulating member 12. Of course, instead of providing an elongated contact surface 10 in this manner, it is also possible to provide the contact member with a central raised elongated portion having an elongated end contact face which will engage the contact surface 9. The end result is that if the contact surface 10 as shown in Fig. 6 extends longitudinally of the vehicle toward the front and rear thereof, then the bar 2 must be tilted toward the front or rear in order to close the switch for disengaging the clutch, and this would normally be the movement of the bar 2 for changing the transmission ratio. If the bar 2 is accidentally tilted to the right or left, the contact surface 9 will only engage the electrically non-conductive surfaces 14 and 15, and thus the clutch will not be accidentally disengaged.

It will be understood that each of the elements described above, or two or more together, may also find a useful application in other types of switches differing from the types described above.

While the invention has been illustrated and described as embodied in switches for automatically disengaging a clutch of a vehicle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A switch comprising, in combination, a first bar having a free end portion; an insulating member carried by and extending from said free end portion of said first bar; a first contact member carried by said insulating member and located at the end thereof distant from said first bar; an elongated hollow member fixed to said first bar, housing said insulating member and first contact member, and extending substantially coaxially from said free end portion of said first bar, said hollow member having distant from said first contact member an inwardly extending annular flange extending substantially normal to the axis thereof; a second bar extending through said annular flange into the interior of said hollow member and having within the latter an outwardly extending annular flange having a plane end face substantially normal to the axis of said second bar and engaging said annular flange of said hollow member, said second bar terminating within said hollow member in a second contact member spaced slightly from and directed towards said first contact member; and spring means within said hollow member located between said first and second bars and engaging the latter for urging the same apart from each other and for maintaining said first and second contact members spaced from each other, whereby when said second bar is tilted against the influence of said spring means said first and second contact members engage each other for closing the switch.

2. A switch comprising, in combination, a first bar having a free end portion; an insulating member fixed to and extending from said free end portion of said first bar, said insulating member having an end face distant from said first bar; a first contact member carried by said insulating member and terminating in an elongated contact surface flush with said end face of said insulating member; an elongated hollow member fixed to said first bar, extending substantially coaxially from said free end portion thereof beyond said first contact member, and having distant from the latter an inwardly extending annular flange extending substantially normal to the axis thereof; a second bar extending through said annular flange into the interior of said hollow member and having an outwardly extending annular flange having a plane end face substantially normal to the axis of said second bar and engaging said inwardly extending annular flange, said second bar terminating within said hollow member in a circular contact surface directed towards and spaced slightly from said first contact member; and spring means within said hollow member respectively engaging said first and second bars for urging the same apart from each other and for maintaining said contact member and contact surface apart from each other until said second bar is tilted against the influence of said spring means.

3. A switch comprising, in combination, a first bar having a free end portion; an insulating member carried by said first bar and extending from said free end portion thereof, said insulating member having an end face distant from said first bar; a first contact member carried by said insulating member and having an elongated contact face flush with said end face of said insulating member; an elongated hollow member fixed coaxially to said first bar and extending from said free end portion thereof beyond said contact member, said hollow member having an inwardly extending annular flange distant from said first bar extending substantially normal to the axis thereof; a second bar extending through said annular flange into the interior of said hollow member and having an outwardly extending annular flange having a plane end face substantially normal to the axis of said second bar and engaging said inwardly extending annular flange, said second bar terminating within said hollow member in a second contact member having a contact face spaced slightly from and directed towards said contact face of said first contact member; and spring means within said hollow member located between and engaging said first and second bars for urging the same apart from each other to maintain said contact members spaced from each other until said second bar is tilted against the influence of said spring means to place said contact members in engagement with each other for closing the switch.

4. A switch comprising, in combination, a first bar having a free end portion; a tubular insulating member carried by and extending from said free end portion of said first bar; a switch contact member carried by said tubular insulating member and extending into the latter, said contact member located at the end of said insulating member distant from said first bar; an electrical lead insulated from said first bar and extending into the latter into electrical engagement with said contact member; an elongated hollow member fixed to and extending substantially coaxially from said free end portion of said first bar, said hollow member having distant from said first bar an inwardly extending annular flange extending substantially normal to the axis thereof; a second bar extending through said annular flange into the interior of said hollow member and having within the latter an outwardly extending annular flange engaging said inwardly extending annular flange of said hollow member; switch contact means located at the free end of said second bar within said hollow member and spaced slightly from said contact member; and spring means within said hollow member respectively engaging said first and second bars for urging the same apart from each other for maintaining said switch contact means and contact member apart from each other until said second bar is tilted against the action of said spring means to place said contact member and switch contact means in engagement with each other for closing said switch.

References Cited in the file of this patent

UNITED STATES PATENTS

| 1,084,155 | Lochman | Jan. 13, 1914 |
| 2,225,221 | Inaki | Dec. 17, 1940 |
| 2,230,891 | Meyerhoefer | Feb. 4, 1941 |
| 2,732,447 | Findley | Jan. 24, 1956 |

FOREIGN PATENTS

| 363,825 | Italy | Oct. 14, 1938 |
| 847,482 | France | July 3, 1939 |